(12) United States Patent
Pasquero et al.

(10) Patent No.: US 8,416,065 B2
(45) Date of Patent: Apr. 9, 2013

(54) OVERLAY FOR ELECTRONIC DEVICE AND METHOD OF IDENTIFYING SAME

(75) Inventors: Jerome Pasquero, Kitchener (CA); Steven Henry Fyke, Waterloo (CA)

(73) Assignee: Research In Motion Limited, Waterloo (CA)

( * ) Notice: Subject to any disclaimer, the term of this patent is extended or adjusted under 35 U.S.C. 154(b) by 728 days.

(21) Appl. No.: 12/494,503

(22) Filed: Jun. 30, 2009

(65) Prior Publication Data

US 2010/0328052 A1   Dec. 30, 2010

(51) Int. Cl.
*G08B 6/00* (2006.01)

(52) U.S. Cl. ............ 340/407.2; 345/172; 345/173; 341/22; 341/27

(58) Field of Classification Search ........ 340/407.2; 345/172–175; 400/472, 479.1; 341/21, 22, 341/27
See application file for complete search history.

(56) References Cited

U.S. PATENT DOCUMENTS

| | | | |
|---|---|---|---|
| 3,813,658 A | 5/1974 | Rich | |
| 4,631,700 A | 12/1986 | Lapeyre | |
| 4,906,988 A | 3/1990 | Copella | |
| 5,450,078 A * | 9/1995 | Silva et al. | 341/23 |
| 5,841,428 A | 11/1998 | Jaeger et al. | |
| 6,545,577 B2 | 4/2003 | Yap | |
| 6,667,738 B2 | 12/2003 | Murphy | |
| 6,763,995 B1 | 7/2004 | Song | |
| 7,091,953 B1 | 8/2006 | Kramer | |
| 7,184,032 B2 * | 2/2007 | Stohrer et al. | 345/173 |
| 2001/0051329 A1 | 12/2001 | Lynch et al. | |
| 2003/0235452 A1 | 12/2003 | Kraus et al. | |
| 2005/0140497 A1 * | 6/2005 | Chiviendacz et al. | 340/5.67 |
| 2006/0256090 A1 * | 11/2006 | Huppi | 345/173 |
| 2007/0254707 A1 | 11/2007 | Griffin et al. | |
| 2008/0067231 A1 | 3/2008 | Song | |
| 2008/0122805 A1 | 5/2008 | Smith et al. | |
| 2009/0079698 A1 | 3/2009 | Takashima et al. | |
| 2010/0328052 A1 * | 12/2010 | Pasquero et al. | 340/407.2 |

FOREIGN PATENT DOCUMENTS

| | | |
|---|---|---|
| EP | 0915411 A2 | 12/1999 |
| EP | 0992953 A | 4/2000 |
| GB | 2140943 A | 12/1984 |
| WO | 9107715 A | 5/1991 |
| WO | 2005088425 A | 9/2005 |

OTHER PUBLICATIONS

Extended EP Search Report, EP Application No. 09164193.6, dated Dec. 30, 2009, 8 pages.
Extended EP Search Report, EP Application No. 09164190.2, dated Feb. 26, 2010, 12 pages.
McGookin, David et al., Investigating Touchscreen Accessibility for People with Visual Impairments, NordiCHI 2008: Using Bridges, Oct. 18-22, Lund, Sweden, 2008, 10 pages.
T3 Talking Tactile Technology, Royal National College for the Blind, www.mcb.ac.uk/t3/index.html, 3 pages.

(Continued)

*Primary Examiner* — Hai Phan
*Assistant Examiner* — Hongmin Fan (57) ABSTRACT

An overlay includes a sheet corresponding to a plurality of keys that are associated with an application for a portable electronic device. An identifier is associated with the application. The identifier is identifiable by the portable electronic device, such that the application is opened upon identification of the identifier.

29 Claims, 4 Drawing Sheets

OTHER PUBLICATIONS

Partial Search Report for European Patent Application No. 09164190.2, dated Dec. 30, 2009, 4 pages.

Non-Final Office Action dated Apr. 26, 2012 for associated U.S. Appl. No. 12/494,566.

EP Examiner's Report, EP Application No. 09164193.6, dated Feb. 29, 2012, 7 pages.

EP Examiner's Report, EP Application No. 09164190.2, dated Feb. 29, 2012, 6 pages.

Canadian Office Action, CA Application No. 2707325 dated Jul. 30, 2012, 2 pages.

Canada Office Action, CA Application 2707277, dated Jul. 27, 2012, 3 pages; this CA Application is a foreign counterpart to U.S. Appl. No. 12/494,566, which was filed on the same day as the present application and contains the same drawings and specification as the present application, but with different claims.

* cited by examiner

OVERLAY FOR ELECTRONIC DEVICE AND METHOD OF IDENTIFYING SAME

FIELD OF TECHNOLOGY

The present disclosure relates to portable electronic devices, including but not limited to portable electronic devices having touch screen displays and their control.

BACKGROUND

Electronic devices, including portable electronic devices, have gained widespread use and may provide a variety of functions including, for example, telephonic, electronic messaging and other personal information manager (PIM) application functions. Portable electronic devices include, for example, several types of mobile stations such as simple cellular telephones, smart telephones, wireless personal digital assistants (PDAs), and laptop computers with wireless 802.11 or Bluetooth capabilities. These devices run on a wide variety of networks from data-only networks such as Mobitex® and DataTAC® networks to complex voice and data networks such as GSM/GPRS, CDMA, EDGE, UMTS and CDMA2000 networks.

Portable electronic devices such as PDAs or smart telephones are generally intended for handheld use and ease of portability. Smaller devices are generally desirable for portability. A touch screen display for input and output is particularly useful on such handheld devices, as such handheld devices are small and are therefore limited in space available for user input and output devices. Further, the screen content on the touch screen display devices may be modified depending on the functions and operations being performed. Even still, these devices have a limited area for rendering content on the touch screen display and for rendering features or icons, for example, for user interaction. With continued demand for decreased size of portable electronic devices, touch screen displays continue to decrease in size.

Improvements in touch screen devices are therefore desirable.

DETAILED DESCRIPTION

The following describes an apparatus for and method of identifying an overlay for an application for a portable electronic device. The overlay includes an identifier that corresponds to an application that is opened after identification of the application associated with identifier. The identifier may include a tactile barcode, a magnets disposed in various orientations, and visual indicators.

For simplicity and clarity of illustration, reference numerals may be repeated among the figures to indicate corresponding or analogous elements. In addition, numerous specific details are set forth in order to provide a thorough understanding of the embodiments described herein. The embodiments described herein may be practiced without these specific details. In other instances, well-known methods, procedures and components have not been described in detail so as not to obscure the embodiments described herein. Also, the description is not to be considered as limited to the scope of the embodiments described herein.

The disclosure generally relates to an electronic device, which in the embodiments described herein is a portable electronic device. Examples of portable electronic devices include mobile, or handheld, wireless communication devices such as pagers, cellular phones, cellular smartphones, wireless organizers, personal digital assistants, wirelessly enabled notebook computers, and the like. The portable electronic device may also be a portable electronic device without wireless communication capabilities such as a handheld electronic game device, digital photograph album, digital camera, or other device.

Figure 1:
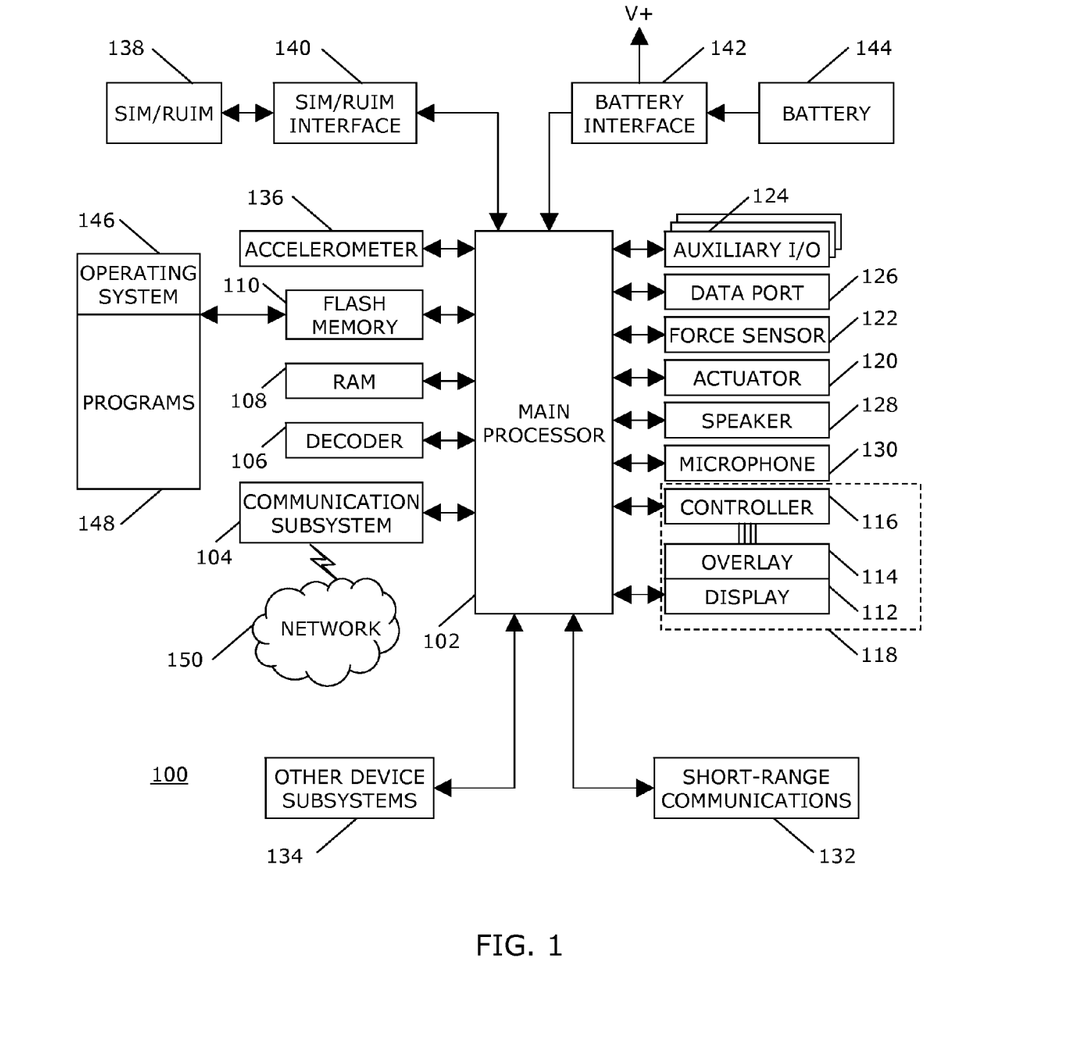
FIG. 1 is a block diagram of a portable electronic device in accordance with the disclosure.

A block diagram of an example of an embodiment of a portable electronic device 100 is shown in FIG. 1. The portable electronic device 100 includes a number of components such as a processor 102 that controls the overall operation of the portable electronic device 100. Communication functions, including data and voice communications, are performed through a communication subsystem 104. Data received by the portable electronic device 100 is decompressed and decrypted by a decoder 106. The communication subsystem 104 receives messages from and sends messages to a wireless network 150. The wireless network 150 may be any type of wireless network, including, but not limited to, data-centric wireless networks, voice-centric wireless networks, and dual-mode networks that support both voice and data communications over the same physical base stations. The portable electronic device 100 is a battery-powered device and includes a battery interface 142 for receiving one or more rechargeable batteries 144.

The processor 102 also interacts with additional subsystems such as a Random Access Memory (RAM) 108, a flash memory 110, a display 112 with a touch-sensitive overlay 114 connected to an electronic controller 116 that together make up a touch-sensitive display 118 (also referred to in the art as a touch screen display), an actuator 120, a force sensor 122, an auxiliary input/output (I/O) subsystem 124, a data port 126, a speaker 128, a microphone 130, short-range communications 132 and other device subsystems 134. The processor 102 interacts with the touch-sensitive overlay 114 via the electronic controller 116. Information, such as text, characters, symbols, images, and other items that may be displayed on a portable electronic device, is displayed on the touch-sensitive display 118 via the processor 102. The processor 102 may also interact with an accelerometer 136 as shown in FIG. 1. The accelerometer 136 may include a cantilever beam with a proof mass and suitable deflection sensing circuitry. The accelerometer 136 may be utilized for detecting direction of gravitational forces or gravity-induced reaction forces.

To identify a subscriber for network access according to the present embodiment, the portable electronic device 100 uses a Subscriber Identity Module or a Removable User Identity Module (SIM/RUIM) card 138 inserted into a SIM/RUIM interface 140 for communication with a network such as the wireless network 150. Alternatively, user identification information may be programmed into the flash memory 110.

The portable electronic device 100 also includes an operating system 146 and software components 148 that are executed by the processor 102 and are typically stored in a persistent store such as the flash memory 110. Additional applications may be loaded onto the portable electronic device 100 through the wireless network 150, the auxiliary I/O subsystem 124, the data port 126, the short-range communications subsystem 132, or any other suitable device subsystem 134.

In use, a received signal such as a text message, an e-mail message, or web page download is processed by the communication subsystem 104 and input to the processor 102. The processor 102 then processes the received signal for output to the display 112 or alternatively to the auxiliary I/O subsystem 124. A subscriber may also compose data items, such as e-mail messages, for example, which may be transmitted over the wireless network 150 through the communication subsystem 104. For voice communications, the overall operation of the portable electronic device 100 is substantially similar except that the received signals are output to the speaker 128 and signals for transmission are generated by the microphone 130.

An overlay for use with an application for a portable electronic device is known. Overlays are typically thin sheets of material that are disposed on a portable device 100 to provide an easier way to interact with the applications that run on the portable device 100. The material may be non-conductive and may include plastic, rubber, silicone, glass, cardboard, and so forth, as known in the art, and may be flexible. Overlays are often adapted to keys associated with an application. The term "keys" as utilized herein, includes virtual or displayed keys that are images displayed on a touch-sensitive display, as well as mechanical keys, such as physical individual keys utilized as part of a keyboard for a portable device 100. Keys may be associated with characters, such as letters, numbers, spaces, and punctuation marks, and/or functions, such as shift, control, alpha, numeric, symbol, alternate, delete, return, enter, power, and so forth, and/or symbols representing actions or operations, for example, play, stop, and pause for a media player, previous and next for a web browser, and so forth. Thus, the term "keys" is not limited to keys from a keyboard.

For example, an overlay utilized with a touch-sensitive display 118 may include holes or cut-outs, or optionally thin membranes with ridges, which align with keys that are displayed on the touch-sensitive display 118, thereby identifying touch areas more perceptibly both visually and by feel. The key areas may optionally be raised. Such an overlay may be utilized, for example, by a visually-impaired person to identify the keys for a specific application. In another example, an overlay for use with mechanical keys may include Braille identifications that indicate the information printed on the mechanical key, e.g., characters and functions.

An identifier for the application associated with or corresponding to the overlay is included with the overlay. Each identifier is uniquely associated with an overlay. One or more overlays may be utilized for an application. The identifiers may be formed as part of the overlay when the overlay is formed, may be inserted in the overlay after the overlay is formed, or may be separate pieces from the overlay. The following text and associated drawings provide various examples of how a device 100 may identify the identifier and associate the identifier with its application in order to open or launch the application.

Figure 2:
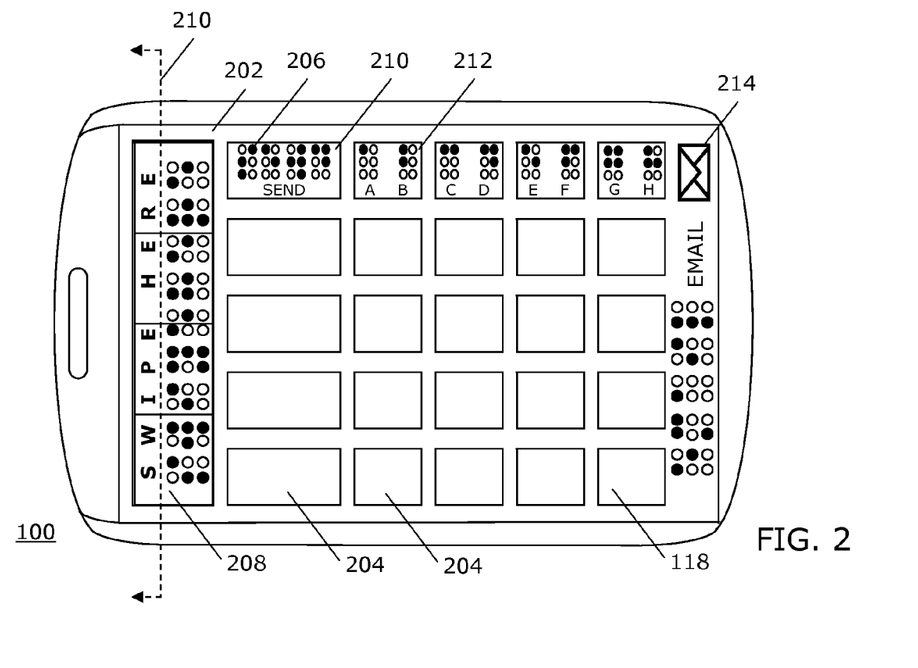
FIG. 2 illustrates an overlay, with a tactile barcode, disposed on a portable electronic device in accordance with the disclosure.

An overlay 202 with a tactile barcode 208 is shown disposed on a portable electronic device in FIG. 2. In this example, the overlay 202 comprises a sheet corresponding to a plurality of keys associated with an email application for a portable electronic device 100. The overlay 202 is shown with a plurality of areas 204 that align and correspond to various different keys. The overlay 202 may include thicker regions between and around these areas 204 to make them more perceptible visually and tactilely. The areas 204 are ideally located above their respective keys for the associated application. The areas 204 may be comprised of holes, or cut-outs, or thin membranes that do not unduly interfere with the ability to select the key below. Identifications 206 of the keys below the overlay 202 may advantageously be included, which identifications 206 may be identified through feel (tactile) or vision, as well as other information for the overlay 202, such as an identification of the application, e.g., EMAIL. For example, the SEND key 210 is shown with a Braille identification 206 and text identification 206. The A and B key 212 is labeled as such in text and Braille. The identification 206 may also be a symbol 214, e.g., an envelope for email, or a physical identifier other than Braille that may be identified through feel (tactile) and/or vision. Although the Braille and text identifications 206 are shown disposed on a thin membrane over the key, the identifications 206 may alternatively be disposed on the regions surrounding the areas 204 for the keys, for example, when the areas 204 are formed as holes or cut-outs.

The overlay 202 also includes an identifier in the form of a tactile barcode 208 comprised of a plurality of sections, which, in the example of FIG. 2, is four sections. Any number of sections may be utilized such that identification of each of the overlays for the various applications is possible. The phrase "SWIPE HERE" is shown on the tactile barcode in text and Braille. A tactile barcode is read by detection of touches along the sections of the tactile barcode, rather than visually reading the barcode. The combination of touch values read for the sections provides a similar function to the combination of bars and spaces on a visual barcode, although the tactile barcode is read differently. Touch values include, for example, simple detection of a touch of any kind (e.g., touch, swipe, or gesture) where "1" indicates a touch and "0" indicates no touch, a capacitance value (see below), a resistance value (e.g., a resistance measurement or detection of one of various levels of resistance), a force value, and so forth, or a combination thereof. When each of the sections is associated with one of at least two different touch values, at least $2^4$ possible different applications may be identified when the tactile barcode comprises four sections. The tactile barcode 208 may advantageously be located in the same part of each overlay 202, and the tactile barcode for each overlay may be positioned over the same part of the touch-sensitive display 118. This part of the touch-sensitive display 118 may be dedicated to the tactile barcode 208, and reading of the tactile barcode 208 may be triggered, for example, by detection of a touch in or above each of the sections within a predetermined period of time. Alternatively, one or more magnets on the sheet may trigger a Hall effect sensor on the device 100, which in turn enters a state where the device expects touch input from the area of the touch-sensitive display 118 below the tactile barcode 208. In other words, the magnet "informs"

the device 100 that a sheet has been overlaid to trigger monitoring for the touch values for the tactile barcode 208. Completion of reading the barcode may take place, for example, when a reading is detected for each section of the tactile barcode 208; by detection of selection of a common and unique tactile barcode completion pattern, not used elsewhere in a tactile barcode; by detection of completion by selection of a physical key or enter-type key on the touch-sensitive display 118; by detection of actuation of a switch engaged by depressing the touch-sensitive display 118 with a threshold force; by detection of a force imparted on the touch-sensitive display 118, and so forth.

Figure 3:
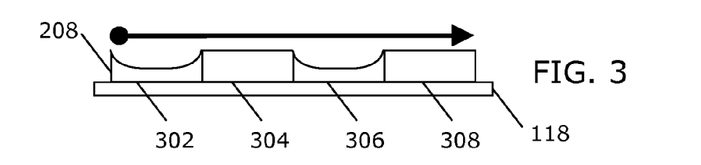
FIG. 3 through FIG. 5 are cross-sections of various tactile barcodes for an overlay in accordance with the disclosure.
Figure 4:
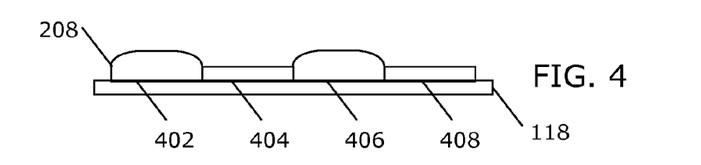
Figure 5:
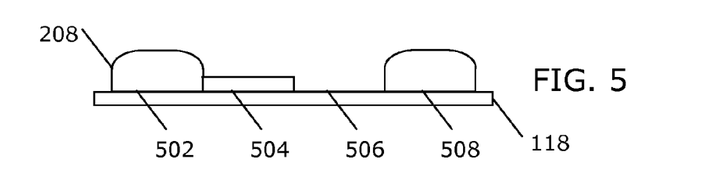

When the tactile barcode 208 is utilized with a touch-sensitive display 118 that is capacitive in nature, touching the different sections of the tactile barcode 208 results in capacitance values as the touch values. Such a result may be achieved when the tactile barcode is comprised of different thicknesses in each of the sections. Cross-sections of various tactile barcodes 208 for an overlay are shown in FIG. 3 through FIG. 5, as taken through the section line 210 of FIG. 2. In these examples, various thicknesses of the sections of the tactile barcode 208 produce different capacitance values. In the example of FIG. 3, two of the sections 302, 306 are closer to the touch-sensitive overlay 118 than the other two sections 304, 308, thereby producing two different capacitance values. In the example of FIG. 4, two of the sections 402, 406 are further from the touch-sensitive overlay 118 than the other two sections 404, 408, thereby producing two different capacitance values. In the example of FIG. 5, two of the sections 502, 508 are furthest from the touch-sensitive overlay 118, one section 506 is very thin or empty and thus closest to the touch-sensitive overlay 118 and one section 504 is between the others. When adjacent sections of the tactile barcode 208 have the same value, a small ridge or groove may be included between the sections to identify their borders more readily. One of the thicknesses of the sections may be 0, which corresponds to a cut-out or hole in the overlay.

Table 1 and Table 2 below give examples of coding of the various sections of the tactile barcode 208 and how the coding is associated with an application. Each different set of touch values, e.g., capacitance values, is associated with an overlay and an application. When a set of capacitance values is found in one of the tables, the associated application may be ascertained. Table 1 illustrates values for tactile barcodes utilizing two different capacitance values, where "0" represents one value and "1" represents the other value, for a total of 16 different codes and up to 16 applications. Table 2 illustrates values for tactile barcodes utilizing three different capacitance values, where "0" represents one value, "1" represents another value, and "2" represents the third value, for a total of 81 different codes ($3^4$) and up to 81 applications. If all of the different codes are not utilized, the codes may be strategically selected to utilize codes that are more easily implemented on the overlay 202 and/or more easily detected by the portable electronic device 100. The various sections of the tactile barcode 208 are assigned values in the table. For example, Section A may be assigned to the first section 302, 402, 502, Section B may be assigned to the second section 304, 404, 504, Section C may be assigned to the second section 306, 406, 506, and Section D may be assigned to the second section 308, 408, 508. Any correlation of sections of the tactile barcode to the Sections in the table may be utilized. Alternatively, an analog capacitive signature may be created for each tactile barcode, where the capacitive values range, for example, from 0% (no capacitance) to 100% (maximum capacitance).

TABLE 1

| Application | Section A | Section B | Section C | Section D |
|---|---|---|---|---|
| Email | 0 | 0 | 0 | 1 |
| Music | 0 | 0 | 1 | 0 |
| Contacts | 0 | 1 | 0 | 0 |
| Calendar | 1 | 0 | 0 | 1 |
| ... | | | | |
| Internet | 1 | 1 | 0 | 1 |

TABLE 2

| Application | Section A | Section B | Section C | Section D |
|---|---|---|---|---|
| Email | 0 | 0 | 0 | 1 |
| Music | 2 | 0 | 1 | 0 |
| Contacts | 0 | 1 | 0 | 2 |
| Calendar | 1 | 0 | 2 | 0 |
| ... | | | | |
| Internet | 2 | 1 | 0 | 1 |

Capacitance values are obtained when a touch is detected along the barcode, e.g., in each of the sections of the tactile barcode 208. When at least one touch is detected along the sections 302, 306, 304, 308 of the tactile barcode 208, for example the one in FIG. 3, the portable electronic device 100 reads the tactile barcode 208. A touch along the tactile barcode 208 comprises any of a swipe in or along each of the sections 302, 306, 304, 308, a separate touch in each of the sections 302, 306, 304, 308, or a touch and a "click" in each of the sections 302, 306, 304, 308. A "click" may refer to actuation of a switch caused by depression of the touch-sensitive display 118 or detection of a force of a predetermined value, which force indicates selection is intended.

Figure 6:
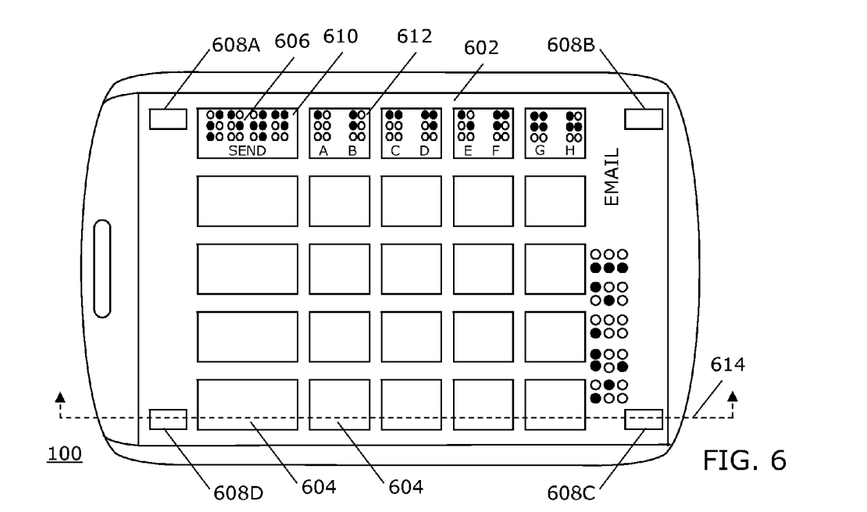
FIG. 6 illustrates an overlay, with a magnet identifier, disposed on a portable electronic device in accordance with the disclosure.

An overlay with a magnet identifier is shown disposed on a portable electronic device in FIG. 6. In this example, which is similar in many ways to the overlay 202 of FIG. 2, the overlay 602 comprises a sheet corresponding to a plurality of keys associated with an email application for a portable electronic device 100. The overlay 602 is shown with a plurality of areas 604 that align and correspond to various different keys. The overlay 602 includes thicker regions between and around these areas 604 to make them more perceptible visually and tactilely. The areas 604 are ideally located above their respective keys for the associated application. The areas 604 may be comprised of holes or thin membranes that do not unduly interfere with the ability to select the key below. Identifications 606 of the keys that lie underneath the overlay 602 may advantageously be included, as well as other information for the overlay 602, such as an identification of the application, e.g., EMAIL. For example, the SEND key 610 is shown with a Braille identification 606 and text identification 606. An area 604 utilized for the A and B key 612 is labeled as such in text and Braille. Although the identifications 606 are shown disposed on a thin membrane over the key, the identifications 606 may alternatively be disposed on the thicker regions surrounding the areas 604 for the keys.

The overlay 602 also includes an identifier in the form of a plurality of magnets 608A, 608B, 608C, 608D disposed in various locations on the overlay 602. Each magnet 608A, 608B, 608C, 608D is located in an orientation with respect to its poles, or lack thereof when no magnet is found in a given location. Each different set of orientations is associated with an application. When the application associated with a set of orientations is identified, the application is opened or launched.

Figure 7:
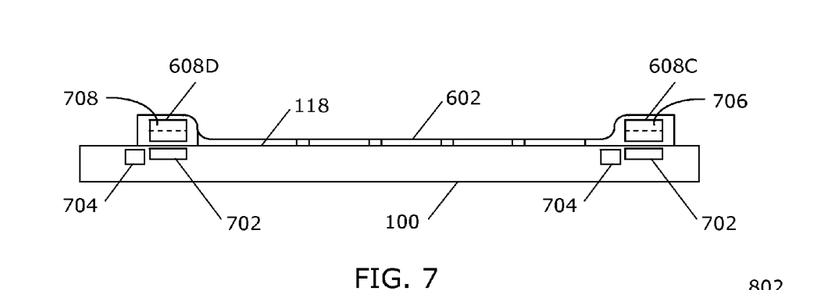
FIG. 7 illustrates a cross-section of an overlay, with a magnet identifier, disposed on a portable electronic device in accordance with the disclosure.

Each location of the magnets 608A, 608B, 608C, 608D has a corresponding location on the portable electronic device 100. When the overlay 602 is correctly positioned with respect to the device 100, the magnets 608A, 608B, 608C, 608D are aligned with their corresponding locations on the device 100, and identification of the set of orientations occurs. Ferromagnetic material 702 may be placed in the corresponding locations to facilitate alignment, such as shown in FIG. 7. The magnets 608A, 608B, 608C, 608D may utilize the ferromagnetic material 702 to align to the device 100 as well as to hold the overlay 602 in position with respect to the keys. Sensors 704, such as Hall effect sensors, may be utilized to identify the orientation, as well as the presence or absence, of the magnets 608A, 608B, 608C, 608D, which sensors are advantageously located near the magnets when the overlay 602 is aligned with the device 100. The orientation 706 for the third magnet 608C is shown with magnetic north on the lower half, and the orientation 708 for the fourth magnet 608D is shown with magnetic south on the lower half, as illustrated in the cross-section in FIG. 7 taken through the section line 614 in FIG. 6. Alternatively, the orientations may be made with respect to the upper half of the magnets 608A, 608B, 608C, 608D. Although the poles of the magnets 608A, 608B, 608C, 608D are shown arranged in a direction perpendicular to the surface of the touch-sensitive display 118, the poles may be arranged in a direction parallel to the surface of the touch-sensitive display 118.

Table 3 and Table 4 below give examples of coding of the set of orientations for the magnets 608A, 608B, 608C, 608D and how the coding is associated with an application. A unique set of orientations may be associated with each of a plurality of overlays 602. When a set of orientations is found in one of the tables, the associated application may be ascertained. Table 3 illustrates values for magnets disposed in two different magnet orientations, where "N" represents one value and "S" represents the other value, for a total of 16 different codes and up to 16 applications. Table 4 illustrates values for tactile barcodes utilizing three different orientations, where "N" represents one value, "S" represents another value, and "Ø" represents the third value when no magnet is placed in a particular location, for a total of 80 different codes ($3^4-1$ because no magnets detected corresponds to no overlay being in place as well, thus orientation Ø Ø Ø Ø is not utilized) and up to 80 applications. If all of the different codes are not utilized, the codes may be strategically selected to utilize codes that are more easily implemented on the overlay 602, such as those with two or more magnets, and/or more easily detected by the portable electronic device 100. Orientations for the various magnets 608A, 608B, 608C, 608D are shown in the table. Any correlation of magnets to the columns in the table may be utilized. Alternatively, the magnets 608A, 608B, 608C, 608D may have various different strengths of magnetic field, facilitating an even larger number of different codes. The magnets may also be disposed in a portrait (up and down, with respect to a viewer's perspective) or landscape (left and right, with respect to a viewer's perspective) orientation to provide more codes. More than four magnets may also be utilized.

TABLE 3

| Application | 608A | 608B | 608C | 608D |
|---|---|---|---|---|
| Email | N | N | N | S |
| Music | N | N | S | N |
| Contacts | N | S | N | N |

TABLE 3-continued

| Application | 608A | 608B | 608C | 608D |
|---|---|---|---|---|
| Calendar | S | N | N | S |
| ... | | | | |
| Internet | S | S | N | S |

TABLE 4

| Application | 608A | 608B | 608C | 608D |
|---|---|---|---|---|
| Email | N | N | N | S |
| Music | Ø | N | S | N |
| Contacts | N | S | N | Ø |
| Calendar | S | N | Ø | N |
| ... | | | | |
| Internet | Ø | S | N | S |

Figure 8:
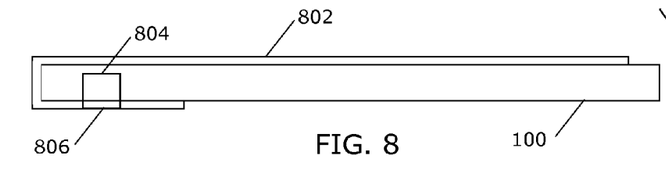
FIG. 8 illustrates a cross-section of an overlay, with a visual indicator, disposed on a portable electronic device in accordance with the disclosure.
Figure 9:
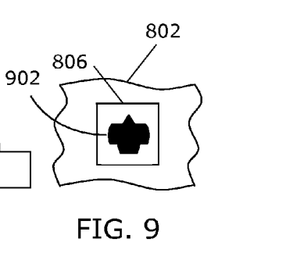
FIG. 9 illustrates a visual indicator for an overlay in accordance with the disclosure.

A cross-section of an overlay with a visual indicator is shown disposed on a portable electronic device in FIG. 8. When a visual indicator 806 is utilized as the identifier for the overlay 802, a camera 804 disposed in the portable electronic device 100 may be utilized to read or identify the visual indicator 806. The overlay 802 may wrap around one end of the portable electronic device 100 such that proper alignment of the overlay 802 with the keys results in alignment of the visual indicator 806 with the camera 804. Examples of visual indicators 806 include barcodes, different translucent colored segments disposed or embedded in the overlay 802, and different shapes 902 disposed or embedded in the overlay 802, such as shown in FIG. 9. Each different barcode, color, or shape is associated with a different overlay 802, and each overlay corresponds to an application.

Figure 10:
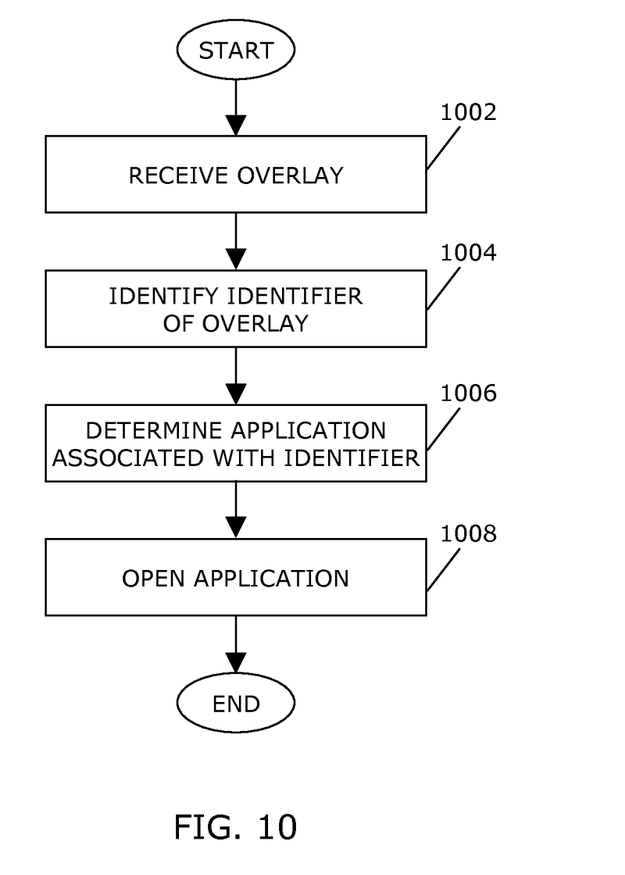
FIG. 10 is a flowchart illustrating a method of identifying an overlay with an identifier in accordance with the disclosure.

A flowchart illustrating a method of identifying an overlay with an identifier is shown in FIG. 10. The flowchart is performed by the portable electronic device, which may utilize its processor 102 to run software to perform some of the steps, as known in the art. The portable electronic device 100 receives 1002 the overlay 202, 602, 802 that is aligned with the keys of the device 100. The identifier associated with the overlay 202, 602, 802 is identified 1004 depending on the nature of the identifier, such as described above. For the following examples of identifiers, the tactile barcode 208 may be identified through the touch-sensitive display 118 that ascertains the capacitive values, the magnets 608A, 608B, 608C, 608D may be identified by sensors 704 that ascertain the orientations of the magnets 608A, 608B, 608C, 608D, and visual indicators 806 may be identified with a camera 804, as described above. Tables, such as those shown above, may be utilized to determine the application for the overlay after identification of the identifier, e.g., capacitance values, magnet orientations, visual indications, and so forth. An application associated with the identifier is determined 1006, e.g., based on the nature of the identifier, as described above, and the identified application is opened or launched 1008. The method may be repeated for each overlay 202, 602, 802 received on the portable electronic device 100.

Figure 11:
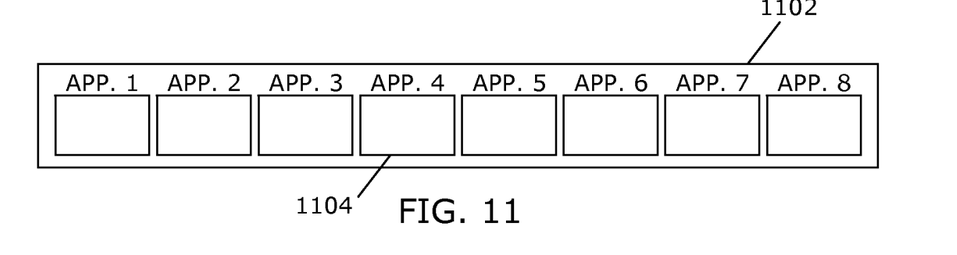
FIG. 11 illustrates an example identifier scheme for an overlay in accordance with the disclosure.

An example of a simple identifier scheme is shown in FIG. 11, which scheme combines the application name with the identifier 1102. In this example, when a tactile barcode that is capacitive in nature is utilized, the box 1104 below the appropriate application label, e.g., APP. 4, is different than the remaining boxes. For example, the identifier 1102 may consist of a cut-out or hole in the box 1104 below the application name associated with the overlay. When a touch of a predetermined value, e.g., a value associated with a cut-out, is detected in any of the boxes 1104, the associated application may be identified. Thus, only a single touch need be detected to identify an application. Alternatively, when the identifier 1102 is a magnetic identifier, a single magnet may be placed in a location near the application name, for example, below the application name or in the box 1104 below the application name. Alternatively, a magnet may be placed in each of the locations except for the area near the relevant application name. Similarly, when the identifier 1102 is a visual indicator, the box 1104 below the application name may be somehow different than the others. For example, the relevant box may be a cut-out or hole, and the application is identified simply as the one through which light is detected. Alternatively, a different shape may be utilized in the box 1104 below the relevant application name.

The present disclosure sets forth an identifier for one or more overlays associated with an application for a portable electronic device. Different types of identifiers are set forth, including a tactile barcode, set of magnet orientations, and visual indicators. Tactile barcodes are advantageous, for example, because they facilitate simple and fast touch identification utilizing detection apparatus present in a touch-sensitive display, such one capacitive in nature. Tactile barcodes provide for identification of numerous different applications with little complexity. Magnetic identifiers are easy to use, may be automatically read by one or more conveniently placed Hall effect sensors, provide for identification of numerous different applications with little complexity, and may hold the overlay in position with respect to the virtual or soft keys on the display. Once the identifier is identified, the application associated with the overlay is ascertained, and the application may be opened or launched without further need for interaction by a user. Overlays with such identifiers make use of such overlays easier for users, including the visually impaired. Applications are launched more quickly because a user does not need to navigate through one or more menus to launch. Non-visual interactions are made easier for sighted as well as visually-impaired users, because the user need not look at the device screen. A computer-readable medium may have computer-readable code embodied therein, and the computer-readable code may be executable by a processor of the portable electronic device to perform the method.

The present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes that come within the meaning and range of equivalency of the claims are to be embraced within their scope.

What is claimed is:

1. An overlay comprising:
a sheet corresponding to a plurality of keys associated with an application for a portable electronic device and including an identifier associated with the application, wherein the identifier is identifiable by the portable electronic device, such that the application is opened upon identification of the identifier, wherein the identifier comprises a plurality of sections, wherein each section has one of at least two different thicknesses, wherein a touch-sensitive display detects a different capacitance for each different thickness when touched, and wherein when at least one touch is detected along the plurality of sections, the application is identified.

2. The overlay of claim 1, wherein the identifier comprises a plurality of magnets disposed in a plurality of first locations on the sheet, and wherein the plurality of first locations are aligned with a plurality of second locations on the portable electronic device.

3. The overlay of claim 2, wherein each of the plurality of magnets is disposed in one of at least two different orientations.

4. The overlay of claim 2, wherein the at least two different orientations comprise magnetic north and magnetic south.

5. The overlay of claim 2, wherein the plurality of magnets hold the overlay in position with respect to the plurality of keys.

6. The overlay of claim 1, wherein the identifier comprises a visual indicator.

7. The overlay of claim 6, wherein the visual indicator comprises a bar code.

8. The overlay of claim 6, wherein the visual indicator comprises a camera-readable shape disposed in the sheet.

9. The overlay of claim 6, wherein the visual indicator comprises a translucent colored segment disposed in the sheet.

10. The overlay of claim 1, further comprising at least one tactile identification related to the application.

11. The overlay of claim 1, wherein the plurality of keys comprises mechanical keys or images displayed on a touch-sensitive display.

12. A method comprising:
receiving, by a portable electronic device including a touch-sensitive display, a first overlay for a plurality of keys, wherein the first overlay corresponds to a first of a plurality of applications that run on the portable electronic device;
identifying a first identifier associated with the first overlay and comprising a plurality of sections, wherein each section has one of at least two different thicknesses, wherein a different capacitance is detected for each different thickness when a touch is detected, wherein identifying comprises detecting, by the touch-sensitive display, a touch associated with each of the plurality of sections, yielding a plurality of capacitance values associated with the first identifier;
determining which of the plurality of applications is associated with the first identifier, yielding a first identified application;
opening the first identified application on the portable electronic device.

13. The method of claim 12, wherein identifying comprises reading a tactile barcode disposed on the first overlay by detecting at least one touch along the tactile barcode.

14. The method of claim 12, wherein a unique set of capacitance values is associated with each of a plurality of overlays, and wherein identifying the first identifier comprises detecting a first set of capacitance values from touches detected on a touch-sensitive display.

15. The method of claim 12, further comprising:
detecting a touch on each of a plurality of sections of the first overlay;
identifying a capacitance value for each of the plurality of sections, yielding a first set of capacitance values;
determining the first application from the first set of capacitance values.

16. The method of claim 12, further comprising:
identifying a capacitance value for each of a plurality of touches on a touch-sensitive display, yielding a first set of capacitance values;
determining the first application from the set of capacitance values.

17. The method of claim 12, further comprising:
receiving, by a portable electronic device, a second overlay, wherein the second overlay corresponds to a second of the plurality of applications;
identifying a second identifier associated with the second overlay;
determining which of the plurality of applications is associated with the second identifier, yielding a second identified application;
opening the second identified application on the portable electronic device.

18. The method of claim 12, wherein identifying comprises ascertaining an orientation for each of a plurality of magnets aligned with the portable electronic device, yielding a set of magnet orientations.

19. The method of claim 18, wherein determining comprises ascertaining which of the plurality of applications is associated with the set of magnet orientations.

20. A computer-readable medium having computer-readable code embodied therein, the computer-readable code executable by a processor of a portable electronic device to perform the method of claim 12.

21. An overlay comprising:
a sheet corresponding to a plurality of keys associated with an application for a portable electronic device;
a tactile barcode associated with the application, wherein the portable electronic device detects at least two touch values from at least one touch along the tactile barcode and associates the at least two touch values with the application, such that the application is opened upon detection of the at least two touch values, wherein the tactile barcode comprises a plurality of sections, wherein each section has one of at least two different thicknesses, wherein a touch-sensitive display detects a different capacitance for each different thickness when a touch is detected, and wherein the at least two touch values comprise capacitance values for each of the plurality of sections.

22. The overlay of claim 21, wherein the plurality of keys comprises mechanical keys or images displayed on a touch-sensitive display.

23. A method comprising:
receiving, by a portable electronic device, an overlay for a plurality of keys, wherein the overlay corresponds to a first of a plurality of applications that run on the portable electronic device;
reading a tactile barcode associated with the overlay, yielding a set of touch values, wherein the tactile barcode comprises a plurality of sections, wherein each section has one of at least two different thicknesses, wherein a touch-sensitive display detects a different capacitance for each different thickness when a touch is detected, and wherein the set of touch values comprise capacitance values for each of the plurality of sections;
determining which of the plurality of applications is associated with the set of touch values, yielding an identified application;
opening the identified application on the portable electronic device.

24. The method of claim 23, wherein reading comprises detecting at least one touch along the tactile barcode.

25. The method of claim 23, wherein reading comprises detecting at least one touch along a plurality of sections of the tactile barcode and identifying a capacitance value for each of the plurality of sections, thereby yielding the set of touch values.

26. The method of claim 23, wherein a unique set of touch values is associated with each of a plurality of overlays.

27. A computer-readable medium having computer-readable code embodied therein, the computer-readable code executable by a processor of the portable electronic device to perform the method of claim 23.

28. A portable electronic device comprising:
a plurality of keys;
a touch-sensitive display configured to identify an identifier associated with an overlay, wherein the identifier comprises a plurality of sections, wherein each section has one of at least two different thicknesses, wherein the touch-sensitive display detects a different capacitance value for each different thickness when a touch is detected, and wherein an application is associated with capacitance values for each of the plurality of sections;
a processor arranged and constructed to open the application associated with the identifier when the identifier is identified when the overlay is aligned with the portable electronic device.

29. The portable electronic device of claim 28, wherein the plurality of keys comprises at least one of mechanical keys and images displayed on a touch-sensitive display.

* * * * *